Feb. 12, 1952 J. C. REAR ET AL 2,585,498
ICE BLOCK MAKING MACHINE
Filed Oct. 19, 1948 3 Sheets-Sheet 1

FIG_1_

INVENTORS
Frederick J. Bobby
James C. Rear
BY

INVENTORS
Frederick J. Bobby
James C. Rear
BY

Feb. 12, 1952  J. C. REAR ET AL  2,585,498
ICE BLOCK MAKING MACHINE
Filed Oct. 19, 1948  3 Sheets-Sheet 3
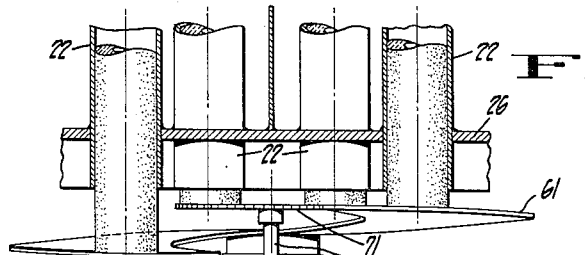
FIG_3_
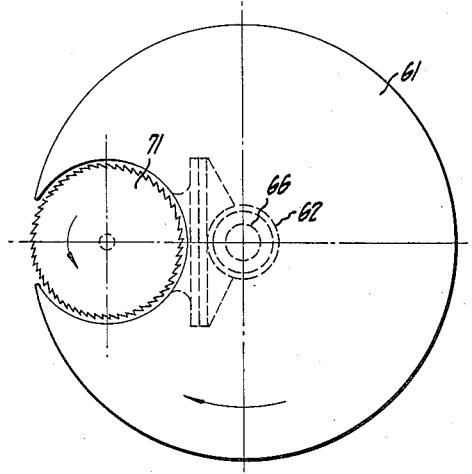
FIG_4_
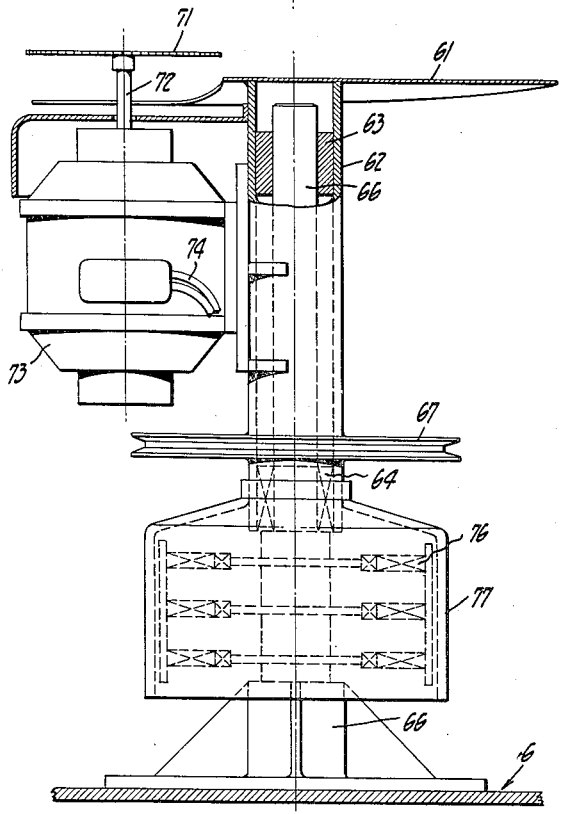
FIG_5_
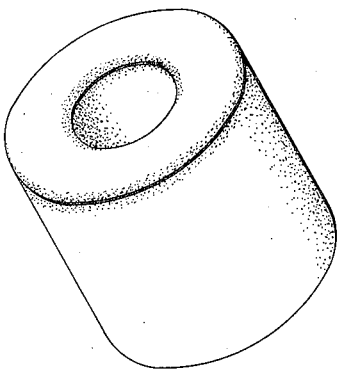
FIG_6_
INVENTORS
Frederick J. Bobby
James C. Rear
BY Patented Feb. 12, 1952

2,585,498

UNITED STATES PATENT OFFICE 2,585,498

ICE BLOCK MAKING MACHINE

James C. Rear and Frederick J. Bobby, Berkeley, Calif., assignors to The Union Ice Company, San Francisco, Calif., a corporation of California Application October 19, 1948, Serial No. 55,418

6 Claims. (Cl. 62—106)

Our invention relates to means for freezing liquids into solids and is especially concerned with a machine for the manufacture of water ice, particularly water ice in a special shape. For various purposes and in many circumstances, it is desirable to provide ice in the form of small chunks or blocks or cylinders or cubes, particularly for beverage and other domestic and social purposes. Sometimes ice is frozen in the form of long rods, circular in cross-section, which are cut or sawn or broken into short blocks for consumption. Sometimes ice is frozen in the form of tubes, annular in cross-section, and of varying lengths for similar purposes. Rectangular blocks or small cubes are likewise well-known. These are manufactured sometimes by directly freezing them in the finished shape or by providing a larger mass of ice which is cut or sawn or melted or chipped into the appropriate smaller configurations.

In recent years it has become increasingly desirable to provide a block of ice of relatively small compass, for example an inch or an inch and a half in each of its three dimensions, and especially one which is round at least in one cross-sectional plane so that it can fit more readily into glass ware normally utilized. Ice blocks of this particular shape are the concern of this application whether or not they have central apertures or passageways therethrough and whether or not, consequently, they are in fact tube ice or rod ice. The term "block" is utilized herein to apply primarily to such a cylindrical shape. The round cross-section, while preferred, is not absolutely essential since a square cross-section or hexagonal or other prismatic contour is entirely permissible.

In general, it is an object of our invention to provide a machine for making ice blocks, preferably of circular or ring-like cross-section.

Another object of our invention is to provide a machine for substantially continuously making ice blocks.

An additional object of the invention is to provide an ice block making machine effective to operate substantially automatically or with very little supervision from an operator.

A further object of the invention is to provide an ice block making machine which is related in general to the present day technique of ice manufacture by the brine method so that the machine is readily includable in customary ice making plants presently operating.

Another object of the invention is to provide an ice block making machine in which the freezing and thawing and sizing steps ensue automatically without complex timing mechanisms or complex controlling instrumentalities.

A further object of the invention is in general to provide an improved ice block making machine.

Other objects together with the foregoing are attained in the embodiment of the invention described in the accompanying description and illustrated in the accompanying drawings in which Figure 1 is a plan of an ice block making machine constructed in accordance with our invention.

Figure 3 is a cross-section, the plane of which is indicated by the line 3—3 of Figure 1.

Figure 4 is a plan of the severing mechanism as illustrated in Figure 3.

Figure 5 is a cross-section, the plane of which is indicated by the line 5—5 of Figure 1.

Figure 6 is an isometric view of a typical ice block manufactured by our ice block making machine.

Figure 1:
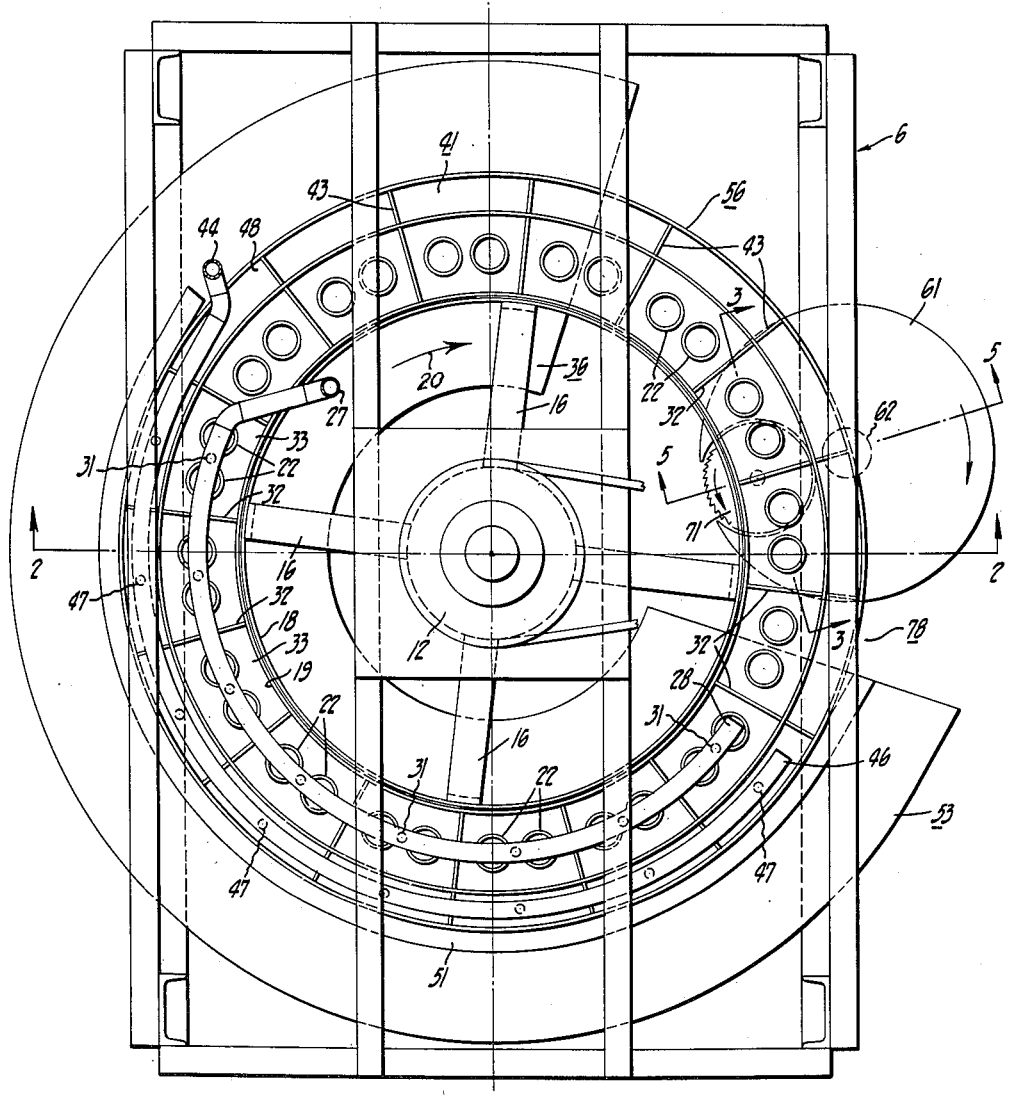
Figure 2:
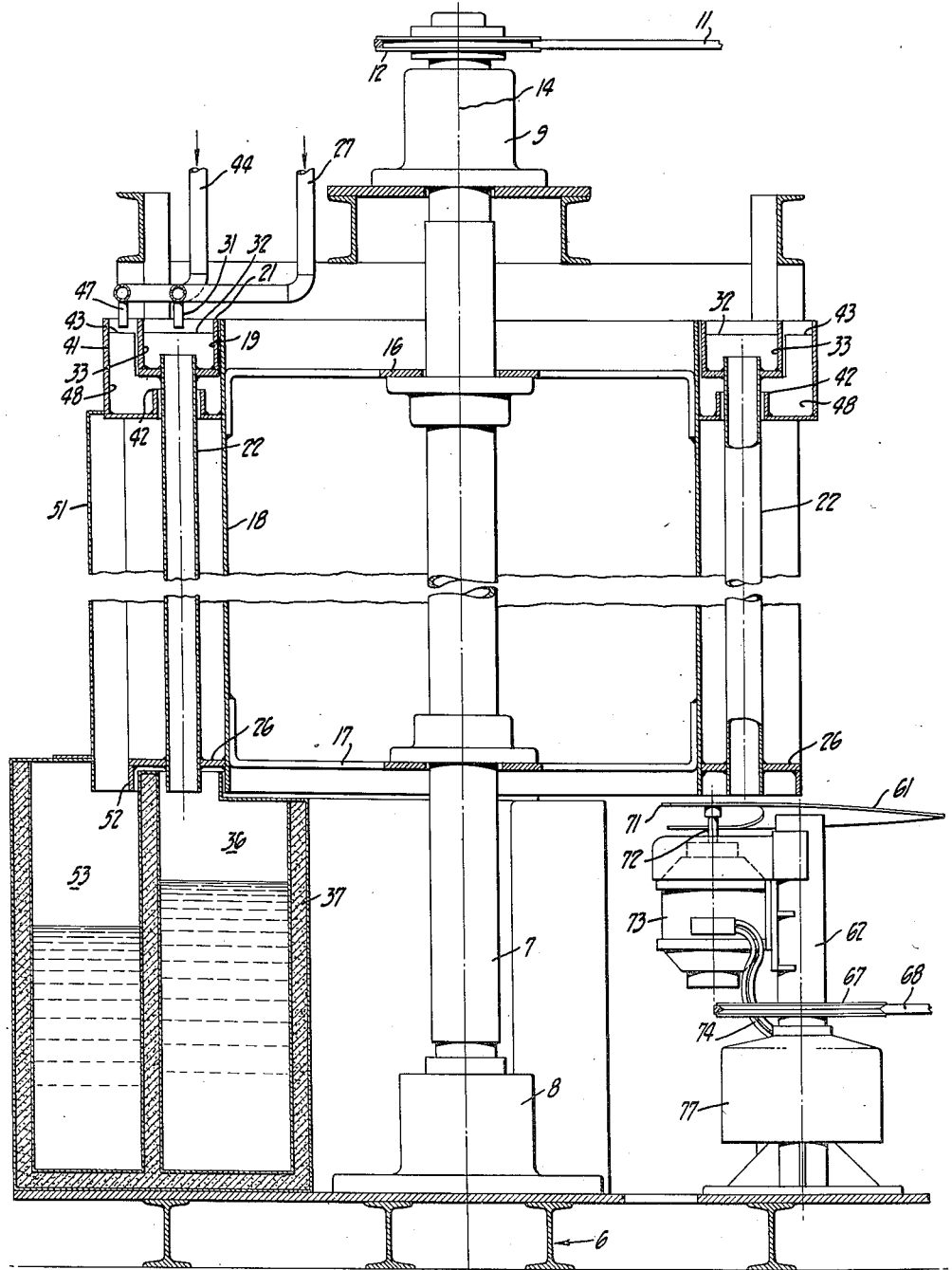
Figure 2 is a cross-section, the plane of which is indicated by the line 2—2 of Figure 1.

In its preferred form, our ice block making machine includes a framework on which a rotor is mounted for rotation about a central vertical axis. The rotor includes a number of vertically arranged tubes situated with their axes parallel to the axis of rotation and provided at their upper ends with a tank adapted to receive water during a part of the tube circuit about the central axis. This water flows through the interior of the tube and the excess is caught for recirculation to the tank. Likewise included in the rotor is a secondary tank receiving brine or other refrigerant and discharging it around the exterior of the tubes for a part of their circuit about the axis. Means are provided for receiving excess brine and recirculating it or restoring it to the secondary tank. For a part of the circuit the tubes are subjected to temperatures higher than the brine temperature so that ice which has formed within them in the shape of tubes or rods is loosened or freed or thawed from the walls of the tubes and tends to drop by gravity. Upholding the ice so freed is a discharge mechanism which progressively lowers the ice tubes or rods from the freezing tubes as the rotor advances and severs the tubes as they are lowered into successive lengths of the desired or predetermined size. The severed portions are gathered and removed from the severing mechanism as desired.

While the ice block making machine of our invention can be incorporated in a number of different ways and in various different sizes and arrangements, depending upon the particular installation and the particular product to be manufactured, it has successfully been incorporated as shown in the accompanying drawings. In this arrangement there is provided a general framework 6 constituted of a suitable base and structural members providing an appropriate frame for a centrally located spindle 7 mounted in a step bearing 8 near the bottom of the frame 6 and likewise carried in a suitable journal 9 at the upper end of the frame. A belt 11 in engagement with a pulley 12 on the spindle 7 serves to rotate the spindle about a vertical axis 14 at a relatively slow rate.

Mounted to turn with the spindle 7 and included in a rotor structure are spiders 16 and 17 at their outer extremities supporting a drum 18 adapted to rotate in the direction of the arrow 20 (Figure 1) as driven by the belt 11. Arranged around the upper periphery of the drum and forming in effect an annular tank or launder is a channel trough 19 arranged with its upper margin 21 at a convenient height with respect to the top of the drum 18 and being provided at intervals with vertically arranged tubes 22 piercing the bottom of the launder or first tank 19 and extending slightly thereabove. The tubes 22 are arranged generally around the entire periphery of the drum and are disposed in pairs with their own axes parallel to the axis 14. The lower ends of the tubes 22 are secured in a plate 26 of annular configuration substantially extending the spider 17.

In accordance with our invention, we provide a means for supplying the tubes 22 with a liquid to be frozen, for example water. For that reason, at a convenient location on the frame 6 there is mounted a water inlet pipe 27 contoured to overlie the tubes 22 and to extend in an arcuate path to an initial point 28, a predetermined distance from the pipe 27 so that in comparison with the speed of rotation of the spindle 7, the length of the water inlet pipe 28 represents a definite time interval. The pipe at appropriate points on its lower margin is provided with nozzles 31 so that water discharged therefrom is directed downwardly in spreading streams. In order that the discharged water will be directed only to appropriate tubes and will not flow throughout the entire first tank 19, the tank is divided by radial partitions 32 situated at convenient intervals, preferably between each pair of the vertical tubes 22. Each of the partitioned compartments 33 receives water for a particular part of the revolution of the rotor so that the water flows over the upper edge of the respective tubes in the compartment and flows by gravity downwardly through the tubes specially adhering to the inner wall thereof.

The down-flowing water discharges from the bottom of the tubes below the annular plate 26 into an annular water tank 36 appropriately provided with insulation 37 and is conveniently returned by a pump, not shown, from the tank 36 to the pipe 27 for recirculation. The tank 36 extends arcuately on the frame for substantially the same distance as does the pipe 27, although the tank can extend past the ends of the pipe, if desired. Since the tube 22 depends somewhat below the plate 26 and below the top of the tank 36, there is provided a direct water path without likelihood of the water escaping or splashing onto other parts of the machine. The water traverse is effectuated without the necessity of any elaborate seal, since the pressure is substantially atmospheric throughout.

In accordance with our invention and in order to provide for cooling and freezing the water, we locate on the drum 18 concentric with the first tank 19 a second tank 41. This is likewise annular in extent and is greater in diameter than the tank 19 and lower in elevation so that it loosely surrounds the tank 21 on three sides. Differences in expansion are thereby provided for. The secondary tank 41 around each of the tubes 22 is provided with an overflow weir 42 spaced from the wall of the tube. The secondary tank 41 is divided by partitions 43 in substantial registry with the partitions 32 and is supplied with brine from a supply pipe 44 bent into an arcuate form substantially concentric with the pipe 27 and extending to an initial point 46 close to the point 28.

Brine supplied to the pipe 44 is discharged through nozzles 47 on the lower side of the pipe into the secondary tank 41 and particularly into the compartments 48 formed between the partitions 43 therein. As the rotor revolves, brine (or other liquid refrigerant) overflows the weirs 42 and descends around the outside of the tubes 22. Splash or dissipation of the refrigerant is precluded by an enclosing shield 51. In the operation of the device, the brine flowing over the outside of the tubes 22 as they travel beneath the pipe 44 causes the temperature to be lowered so that some of the water flowing down the inside of the tubes freezes from the interior periphery of the tubes toward the center thereof. The freezing increases the amount of ice within the tubes, either until the central water passageway therethrough is relatively small or is finally nonexistent. This depends upon the time of freezing, in turn dependent upon the speed of rotation and the length of the brine pipe 44. The excess brine, after taking up some of the heat from the water flowing through the tubes 22, flows over the plate 26 and through an outlet aperture 52 into a brine tank 53 generally embracing the tank 36 and also covered with insulation. The brine in excess from the tank 53 is removed by a pump (not shown) and is sent back for a further traverse. Heat is removed from it at a convenient time during the recirculatory process.

By the time each tube has rotated for approximately a half revolution, the water within it has frozen, that is, the excess has been recirculated a number of times, having become cooler each time, until finally the tube is lined with a core or interior tube or rod of ice. The further advance of the rotor about the spindle axis 14 brings the tubes out of the zone of refrigeration and into a zone 56 or portion of their advance wherein no further water is added and no liquid refrigerant is discharged around them. This zone is relatively warm so that the ice is in part thawed and is released from its adherence to the tube walls. That being so, the ice is no longer supported by the tubes and falls by gravity.

Just prior to the time that the ice melts sufficiently to be released and to fall from any one tube, the rotation of the mechanism brings the particular tube just above a supporting and severing device. This is especially illustrated in Figures 3 and 5 and constitutes a special mechanism in the nature of a circular table 61 having a helicoidal surface contour. It is mounted on a tube 62 carried by journals 63 and 4 on a pedestal shaft 66 supported on the framework 6. The table 61 is revolved at a relatively slow rate approximately in time with the rotation of the spindle 7 by means of a belt pulley 67. This is connected by a driving belt 68 to a source of power (not shown) interconnected with the belt 11 so that the rotation of the table 61 occurs once for a predetermined increment of rotation of the spindle 7.

Since the table 61 is substantially helicoidal, it supports the lower end of the freed or thawed ice rod or tube but permits such rod or tube to lower gradually as the spindle 7 and especially as the table 61 revolve. The amount that the helicoidal table 61 is warped or axially displaced corresponds to the axial length of a finished ice block. That is, each of the ice rods or tubes as shown in Figure 3 descends for the axial dimension of a finished ice block as the table 61 revolves once and as the spindle 7 advances a relatively small amount.

We provide means for severing the progressively lowered ice rods or tubes effective once during each rotation of the table 61. This means is a rapidly driven saw 71 or equivalent cutting device extending the helix 61 and mounted on a shaft 72 driven by a relatively high speed motor 73 appropriately fastened on the tube 62 and revolving with it. The motor 73 is preferably electric and its lead wires 74 extend to a plurality of slip ring connectors 76 suitably mounted within a housing 77 beneath the pulley 67. The motor is continuously supplied with energy and revolves the saw 71 during the relative rotation of the table 61.

As the table 61 revolves, the supported ice tubes or rods slide downwardly over its inclined surface the amount of the axial offset and once each revolution encounter the saw 71 and are severed. The severed portions, having the appropriate length, then fall from the machine into a receiving hopper (not shown). Each of the severed portions or blocks is of the general configuration and proportion shown in Figure 6, although the central passageway may be larger or smaller than that illustrated. As the table 61 revolves beneath each of the successively advancing tubes 22, it severs an appropriate length from the gravitally descending freed or thawed ice column therein and thereby provides another of a stream of ice blocks.

The timing and proportioning of the mechanism are such that when any one of the various tubes 22 has revolved over the table 61 and the table 61 has made a number of rotations severing a plurality of blocks, all of the ice has been discharged from the tube which is then free for recycling. The tube then passes through a neutral zone 78, and is ready to repeat its travel by passing beneath the initial point 28 of the fresh water supply pipe and alongside the initial point 46 of the brine supply pipe. In this way the tubes operate continuously to serve as molds or forms for receiving material to be frozen, such as water. This is surrounded by flowing refrigerant, such as brine, for sufficient time so that tubes or rods of ice are formed. These tubes or rods are subsequently thawed and being freed, descend by gravity onto a revolving helical table which lowers them gradually to an appropriate protruding or depending length. They are then severed by a saw or comparable means into separate, finished ice blocks. These are discharged from the machine for use.

We claim:

1. An ice block making machine comprising a frame, a spindle mounted on said frame for rotation about a vertical axis, an upright tube mounted on said spindle and displaced from said axis, means for refrigerating said tube during part only of its rotation with said spindle, means for supplying said tube with water during said part of its rotation, and means on said frame for directly supporting the bottom of ice released from said tube during another part of its rotation.

2. An ice block making machine comprising a frame, a spindle mounted on said frame for rotation about a vertical axis, a vertical tube mounted on said spindle and displaced from said axis, a tank mounted to rotate with and opening into the upper end of said tube, means for supplying said tank with water, a second tank mounted to rotate with and opening around the upper end of said tube, means for supplying said second tank with a liquid refrigerant, means extending beneath said tube for supporting ice disposed therein, and means for operating said supporting means during rotation of said tube for progressively lowering said ice.

3. An ice block making machine comprising a frame, a spindle mounted on said frame for rotation about a vertical axis, a vertical tube mounted on said spindle and displaced from said axis, a tank mounted to rotate with and opening into the upper end of said tube, means for supplying said tank with water during a part only of its rotation, a second tank mounted to rotate with and opening around said tube, means for supplying said second tank with a liquid refrigerant during a part only of its rotation, and means effective to receive ice from within said tube during another part of the tube rotation.

4. An ice block making machine comprising a frame, a spindle mounted on said frame for rotation about a vertical axis, a vertical tube mounted on said spindle and displaced from said axis, a tank mounted to rotate with and opening into the upper end of said tube, means for supplying said tank with water, means on said frame for receiving excess water from said tube, a second tank mounted to rotate with and opening around said tube, means for supplying said second tank with liquid refrigerant, means on said frame for receiving excess refrigerant from said tube, and means on said frame for receiving ice released from said tube.

5. An ice block making machine comprising a frame, a spindle mounted on said frame for rotation about a vertical axis, a vertical tube mounted on said spindle and displaced from said axis, a tank mounted to rotate with and opening into the upper end of said tube, means on said frame for receiving excess water from said tube, means for returning said excess water to said tank, a second tank mounted to rotate with and opening around said tube, means for supplying said second tank with liquid refrigerant, means on said frame for receiving excess refrigerant from said tube, means for returning said excess refrigerant to said second tank, and means on said frame for receiving ice released from said tube.

6. An ice block making machine comprising a frame, a substantially vertical tube mounted on said frame, means for moving said vertical tube in a horizontal direction on said frame, means for refrigerating said tube during one part only of its movement, means for supplying the upper end of said tube with water during said one part of its movement to form ice in said tube, and means for supporting at progressively lower levels ice released from but partly within the confines of said tube during movement of said tube.

JAMES C. REAR.
FREDERICK J. BOBBY.

REFERENCES CITED

The following references are of record in the file of this patent:

UNITED STATES PATENTS

| Number | Name | Date |
|---|---|---|
| 2,239,234 | Kubaugh | Apr. 22, 1941 |
| 2,431,916 | Caesar | Dec. 2, 1947 |
| 2,466,831 | Van Vleck | Apr. 12, 1949 |